United States Patent
Ashby et al.

(10) Patent No.: US 11,492,124 B2
(45) Date of Patent: Nov. 8, 2022

(54) DRESS COVER DRAWSTRING RETENTION SYSTEM

(71) Applicant: B/E Aerospace, Inc., Winston-Salem, NC (US)

(72) Inventors: Robert Ashby, Winston-Salem, NC (US); David Poole, Winston-Salem, NC (US); Joseph Meals, Pfafftown, NC (US); Andrew Mooney, Winston-Salem, NC (US); Michael Kreitz, High Point, NC (US); Adam Brown, Winston-Salem, NC (US); Mack Thomas Moore, Advance, NC (US); David Genco, Pinnacle, NC (US); Gregory Bonomo, Jamestown, NC (US); Zakarya Peterson, Jamestown, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/204,172

(22) Filed: Mar. 17, 2021

(65) Prior Publication Data
US 2021/0291988 A1    Sep. 23, 2021

Related U.S. Application Data

(60) Provisional application No. 62/992,572, filed on Mar. 20, 2020.

(51) Int. Cl.
B64D 11/06    (2006.01)

(52) U.S. Cl.
CPC ................. *B64D 11/0647* (2014.12)

(58) Field of Classification Search
CPC ........ B64D 11/0647; B60N 2/60; A47C 7/021; A47C 7/0213
USPC ....................................................... 297/228.11
See application file for complete search history.

(56) References Cited

U.S. PATENT DOCUMENTS

| | | | |
|---|---|---|---|
| 1,817,404 A | 8/1931 | Whaley | |
| 1,975,599 A | 10/1934 | Fry | |
| 4,396,227 A * | 8/1983 | Neilson | B60N 2/609 297/228.11 |
| 7,607,732 B2 | 10/2009 | Beroth et al. | |
| 8,820,833 B2 * | 9/2014 | Tsuchiya | B60N 2/682 297/228.13 |
| 9,669,742 B1 | 6/2017 | Bailey | |

(Continued)

FOREIGN PATENT DOCUMENTS

| | | |
|---|---|---|
| FR | 1443599 A | 6/1966 |
| GB | 2339683 A | 2/2000 |

OTHER PUBLICATIONS

Extended Search Report for European Application No. 21164111.3 dated Jul. 21, 2021, 7 pages.

*Primary Examiner* — Mark R Wendell
(74) *Attorney, Agent, or Firm* — Suiter Swantz pc llo

(57) ABSTRACT

A retention system for an aircraft seat dress cover defines a cable channel sewn around the periphery of a back portion. A cable in the cable channel is tightened to tighten the aircraft seat dress cover around an aircraft seat back. Adjustable buckles at terminals of the cable interlock and allow the cable to be tightened. A midpoint strap is disposed on opposing sides of the periphery to allow the aircraft seat dress cover to more fully conform to the structure of the aircraft seat.

13 Claims, 5 Drawing Sheets

(56) References Cited

U.S. PATENT DOCUMENTS

| | | |
|---|---|---|
| 10,188,220 B2 | 1/2019 | Reaves |
| 10,966,541 B2 * | 4/2021 | Sosa ................ A63B 71/0036 |
| 2002/0043834 A1 * | 4/2002 | Jackson ................ A47C 31/11 |
| | | 297/228.1 |
| 2008/0079297 A1 | 4/2008 | Perry |
| 2011/0043013 A1 | 2/2011 | Sugiura et al. |
| 2016/0129819 A1 | 5/2016 | Johnson, Jr. et al. |
| 2019/0135148 A1 | 5/2019 | Dumler et al. |
| 2019/0283637 A1 | 9/2019 | Strong et al. |

* cited by examiner

DRESS COVER DRAWSTRING RETENTION SYSTEM

PRIORITY

The present application claims the benefit under 35 U.S.C. § 119(e) of U.S. Provisional App. No. 62/992,572 (filed Mar. 20, 2020), which is incorporated herein by reference.

BACKGROUND

Existing aircraft seat dress covers are difficult to install and require special tools. Aircraft seats often have special contours that require specially manufactured seat dress covers. Loose fitting or poorly attached seat dress covers may pull-out or detach from the aircraft seat.

It would be advantageous to have an easily installed aircraft seat dress cover that could be secured to the seat back frame to prevent pull-out, and that could be used on different types of aircraft seats.

SUMMARY

In one aspect, embodiments of the inventive concepts disclosed herein are directed to a retention system for an aircraft seat dress cover. The aircraft seat dress cover defines a cable channel sewn around the periphery of a back portion. A cable in the cable channel is tightened to tighten the aircraft seat dress cover around an aircraft seat back. Adjustable buckles at terminals of the cable interlock and allow the cable to be tightened.

In a further aspect, a midpoint strap is disposed on opposing sides of the periphery. The midpoint strap allows the aircraft seat dress cover to more fully conform to the structure of the aircraft seat.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
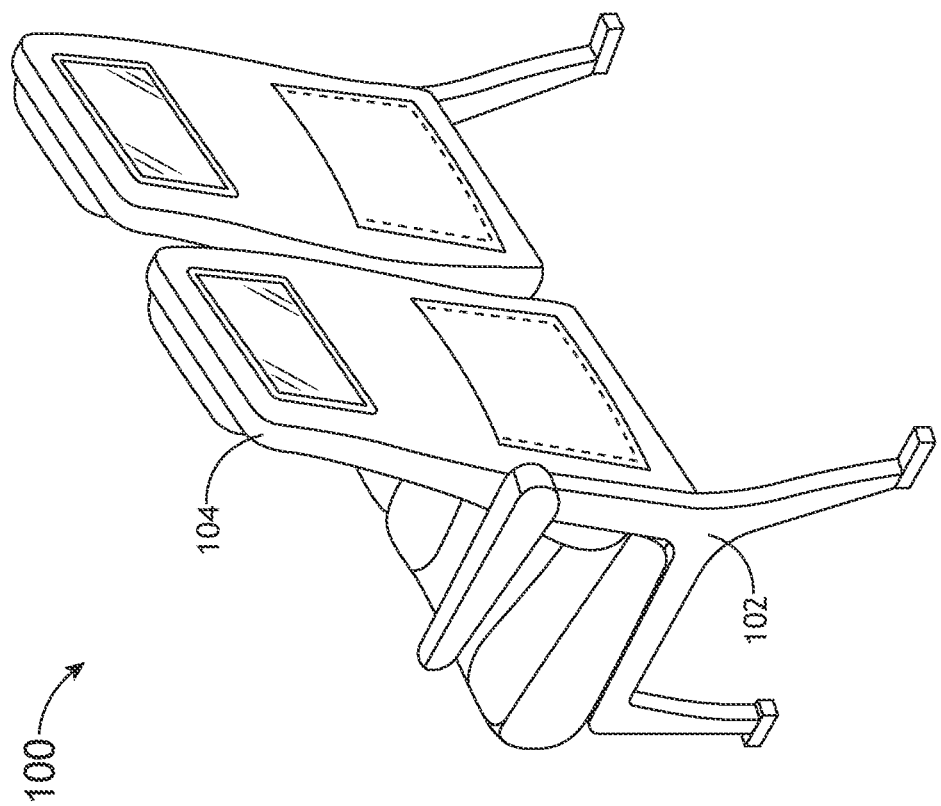
FIG. 1 shows an environmental view of an aircraft seat useful for implementing exemplary embodiments.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a retention system for an aircraft seat dress cover. The aircraft seat dress cover defines a cable channel sewn around the periphery of a back portion. A cable in the cable channel is tightened to tighten the aircraft seat dress cover around an aircraft seat. Adjustable buckles at terminals of the cable interlock and allow the cable to be tightened.

Referring to FIG. 1, an environmental view of an aircraft seat 100 useful for implementing exemplary embodiments is shown. The aircraft seat 100 comprises a frame 102 and a seat back portion 104 which generally comprises a seat back frame and cushion. The seat back portion 104 is often specifically contoured such that different models of aircraft seat 100 require specially made dress covers to fit properly.

Figure 2:
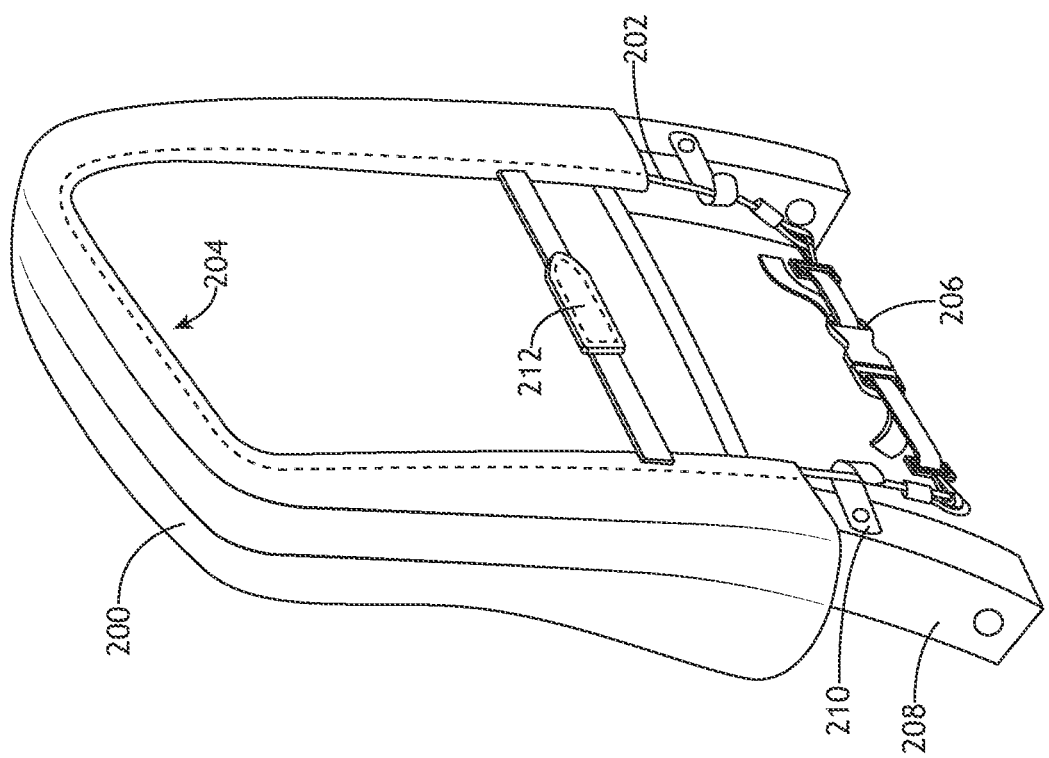
FIG. 2 shows a perspective, environmental view of an aircraft seat dress cover according to an exemplary embodiment.

Referring to FIG. 2, a perspective, environmental view of an aircraft seat dress cover 200 according to an exemplary embodiment is shown. The aircraft seat dress cover 200 comprises a seat cover body that generally wraps around a corresponding aircraft seat back portion. A peripheral or perimeter portion of the seat cover body partially overlaps a back surface of the seat back portion (the back surface of the seat back frame).

The aircraft seat dress cover 200 defines a cable channel 204 at the peripheral portion. The cable channel 204 may comprise a sewn, overlapping portion of material (fabric, leather, polyester, etc.), or a dedicated element affixed to the material of the aircraft seat dress cover 200. A cable 202 within the cable channel 204 may be tightened via one or more tightening elements 206 connected to the cable 202. Tightening the cable 202 tightens the aircraft seat dress cover 200, substantially uniformly, around the seat back portion. Furthermore, tightening via a cable 202 in a cable channel 204 at the periphery of the seat cover body tends to cause the aircraft seat dress cover 200 to generally conform to the aircraft seat back portion, including model specific contours. Also, a substantially uniform fit, tightened and secured via the cable and one or more tightening elements 206 may resist pull-out of the aircraft seat dress cover 200 up to a minimum of 30 pounds of force along the peripheral edges.

In at least one embodiment, the seat back portion comprises a frame 208 having a plurality of cable engaging elements 210. The cable engaging elements 210 may be disposed on the frame 208 such that the cable 202 may wrap around the cable engaging elements 210 to redirect the cable 202 from a downward or vertical direction to sideways or horizontal direction. Such redirection allows the tightening elements 206 to complete a loop including the cable 202. Furthermore, the portion of the cable 202 in the cable channel 204 is maintained in an orientation (generally conforming to the outline of the seta back portion) that facilitates substantially uniform tightening. Also, the cable engaging elements 210 prevent lateral forces on the cable channel 204 which may cause excessive wear, tearing, distortion, or fatigue that may shorten the useful life of the aircraft seat dress cover 200.

In at least one embodiment, the aircraft seat dress cover 200 includes a midpoint strap 212 disposed at opposing edges of the peripheral portion; for example, the midpoint strap 212 may be connected the peripheral portion along each vertical edge of the aircraft seat dress cover 200, at some point below the top of the seat back portion and above the tightening elements 206. Furthermore, the midpoint strap 212 may be disposed at a location generally conforming to contour changes in aircraft seats. While not specific to any particular aircraft seat, it may be appreciated that models of aircraft seats may include contour changes that generally correspond to a location on the seat back portion (for example, a bottom half of the seat back portion). In at least one embodiment, the midpoint strap 212 may comprise an elastic strap configured to apply a lateral force when installed over the seat back portion.

It may be appreciated that in at least one embodiment, the components of the aircraft seat dress cover 200 may be obscured by seat back accessories.

Figure 3:
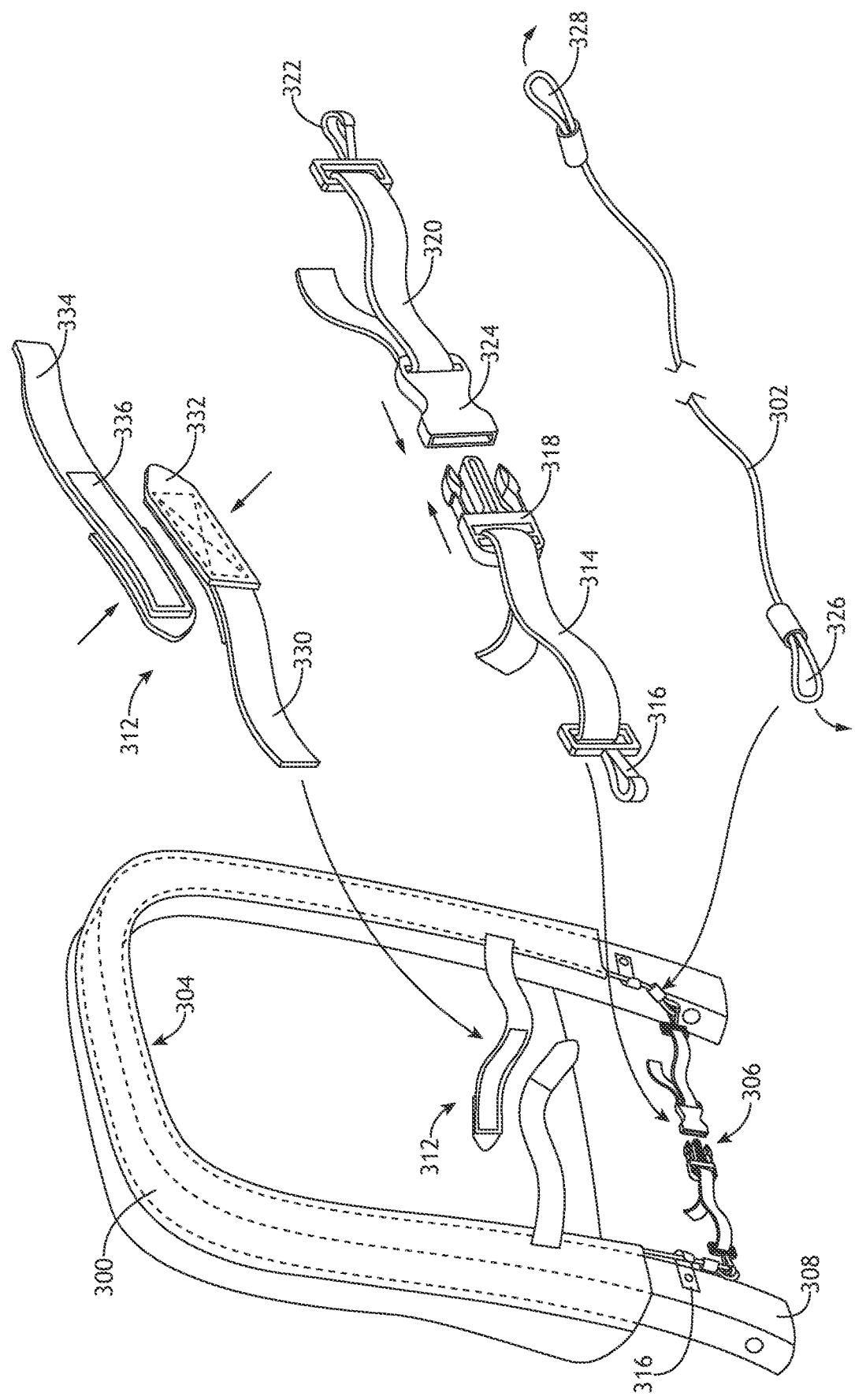
FIG. 3 shows perspective and detail views of an aircraft seat dress cover according to an exemplary embodiment.

Referring to FIG. 3, perspective and detail views of an aircraft seat dress cover 300 according to an exemplary embodiment is shown. Where a seat back dress cover 300 defines a cable channel 304 at the peripheral portion, and a cable 302 passing through the cable channel 304 tightens the aircraft seat dress cover 300 around a seat back portion via one or more tightening elements 306, those tightening elements 306 may comprise adjustable pull straps 314, 320. A first adjustable pull strap 314 is connected to a first terminus of the cable 302 via a cable connection element 316 (such as a clip configured to engage a loop defined in the cable terminus). Likewise, a second adjustable pull strap 320 is connected to a second terminus of the cable 302 via a cable connection element 322.

In at least one embodiment, each pull strap 314, 320 includes an interlocking element 318, 324. The interlocking elements 318, 324 may comprise corresponding portions of a buckle that engage each other to create a closed loop including the cable 302. In such embodiment, a seat back frame 308 may include cable engaging elements 310 to redirect the cable 302 to a allow the interlocking elements 318, 324 to engage while allowing the cable 302 to generally conform to the shape of the seat back portion. Alternatively, or in addition, the seat back frame 308 may include frame interlocking elements configured to engage the corresponding interlocking elements 318, 324 connected to the cable 302 without forming a closed loop.

In at least one embodiment, the cable engaging elements 310 may directly engage corresponding loops in the cable terminals. In such embodiment, the cable 302 may have elastic characteristics.

The aircraft seat dress cover 300 may include a midpoint strap 312. In at least one embodiment, the midpoint strap 312 comprises a first strap element 330 and a second strap element 334. The first strap element 330 is connected to one vertical component of the aircraft seat dress cover periphery while the second strap element 334 is connected to the opposing vertical component of the aircraft seat dress cover periphery. Each strap element 330, 334 may comprise corresponding elements of hook-and-loop fabric 332, 336. Hook-and-loop fabric 332, 336 allows the midpoint strap 312 to be adjusted as necessary to conform to the seat back portion.

Figure 4:
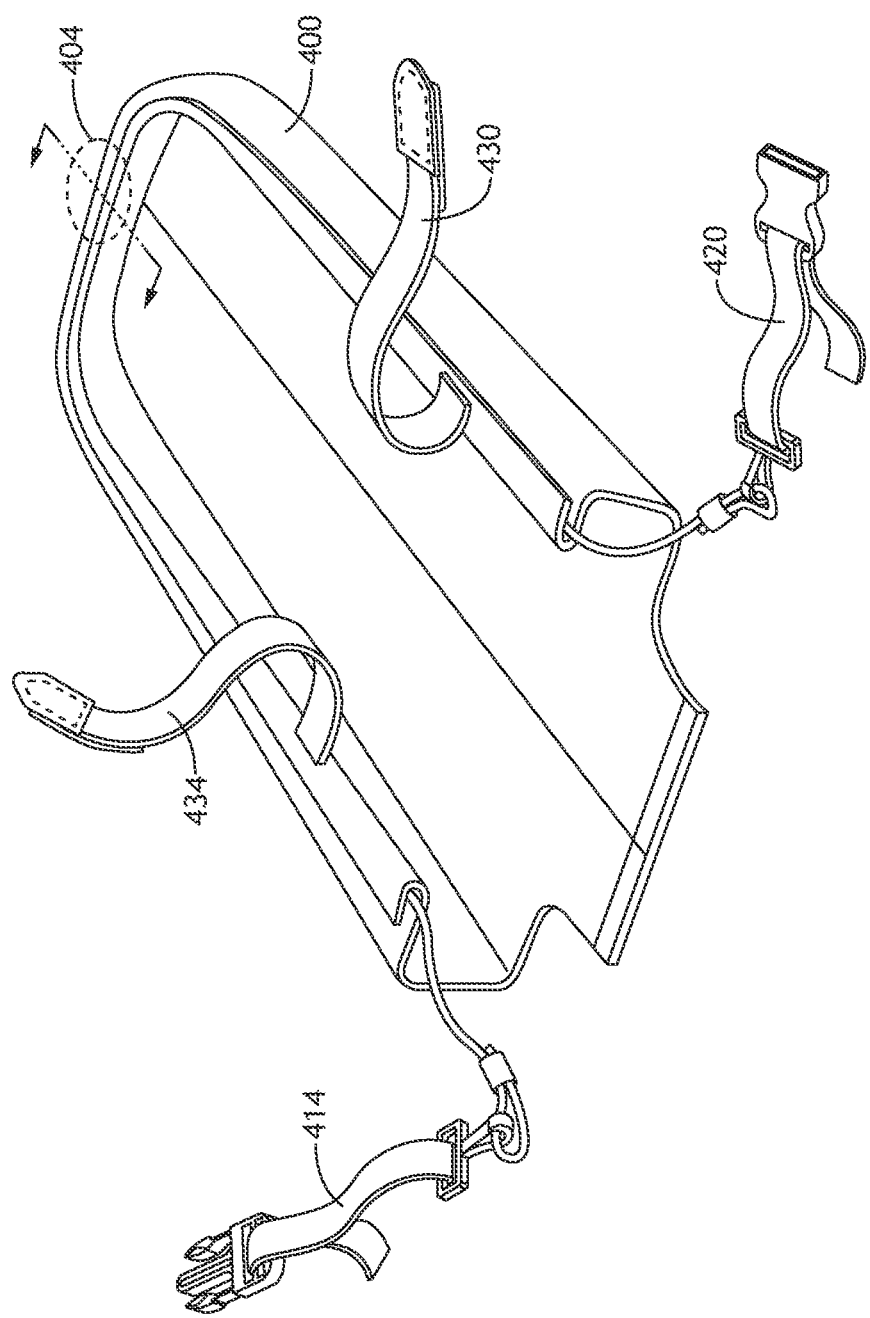
FIG. 4 shows a perspective view of an aircraft seat dress cover according to an exemplary embodiment.
Figure 5:
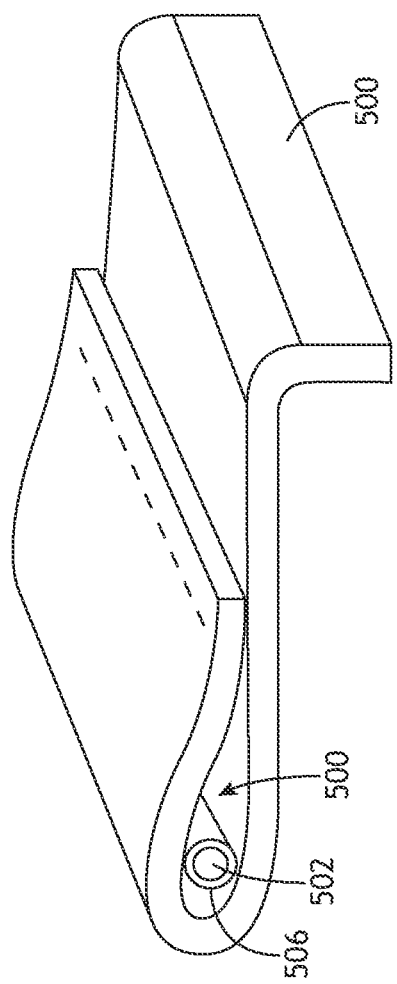
FIG. 5 shows a detail, cross-sectional view of a cable channel in an aircraft seat dress cover according to an exemplary embodiment.

Referring to FIGS. 4 and 5, a perspective view and a detail, cross-sectional view of a cable channel 404 in an aircraft seat dress cover 400 according to an exemplary embodiment are shown. Where an aircraft seat dress cover 400 includes a cable channel 404 and corresponding cable 402 to tighten the aircraft seat dress cover 400 around a seat back portion, a cable liner 506 may be disposed in the cable channel 404. The cable 402 is disposed inside the cable liner 506. During tightening, such as via one or more tightening elements 414, 420, the cable 402 may move more freely inside the cable liner 506 than it would if abutting the interior portion of the cable channel 404. The cable liner 506 also protects the material from wear caused by the cable 402.

It may be appreciated that one or more midpoint straps 430, 434 may alter the shape of the periphery of the aircraft seat dress cover 400. The cable liner 506 may also ameliorate friction and wear that might be caused by such shape alterations.

An aircraft seat dress cover retention system according to the present disclosure offers reliable retention over the course of in-flight usage and prevents premature failure and dress cover pull-out from the seat back and seat back trim features. Installation of the dress cover can be performed without tools or the removal of shrouds and covers in most applications.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An aircraft seat dress cover comprising:
   a seat cover body defining a cable channel in a peripheral portion;
   a cable disposed in the peripheral channel, the cable defining a first terminus and a second terminus;
   tightening elements disposed on each of the first terminus and the second terminus; and
   a plurality of cable engaging elements disposed on a corresponding seat frame, wherein the cable is wrapped around each of the plurality of cable engaging elements wherein:
      the seat cover body is configured to wrap around a seat back frame with the peripheral portion disposed at a back surface of the seat back frame; and
      the tightening elements are interlocked corresponding terminals disposed on a seat back frame to tighten the cable and the peripheral portion around the back surface.

2. The aircraft seat dress cover of claim 1, further comprising a cable liner disposed in the cable channel, the cable liner configured to reduce friction in the cable channel when the cable is tightened.

3. The aircraft seat dress cover of claim 1, further comprising a midpoint strap disposed on opposing ends of the peripheral portion.

4. The aircraft seat dress cover of claim 3, wherein the midpoint strap comprises:
   a first strap element disposed on a first side of the peripheral portion, the first strap element comprising a hook portion of a hook-and-loop connector; and
   a second strap element disposed on a second side of the peripheral portion, the second strap element comprising a loop portion of a hook-and-loop connector.

5. The aircraft seat dress cover of claim 3, wherein the midpoint strap comprises an elastic strap.

6. The aircraft seat dress cover of claim 1, wherein the tightening elements on each of the first terminus and the second terminus are configured to interlock with each other.

7. An aircraft seat comprising:
   a seat back frame;
   an aircraft seat dress cover comprising:
      a seat cover body defining a cable channel in a peripheral portion;
      a cable disposed in the peripheral channel, the cable defining a first terminus and a second terminus; and
      tightening elements disposed on each of the first terminus and the second terminus; and
   a plurality of cable engaging elements disposed on the seat frame, wherein the cable is wrapped around each of the plurality of cable engaging elements,
   wherein:
      the seat cover body is configured to wrap around the seat back frame with the peripheral portion disposed at a back surface of the seat back frame; and
      the tightening elements are interlocked with corresponding terminals disposed on a seat back frame to tighten the cable and to tighten the peripheral portion around the back surface.

8. The aircraft seat of claim 7, wherein the aircraft seat dress cover further comprises a cable liner disposed in the cable channel, the cable liner configured to reduce friction in the cable channel when the cable is tightened.

9. The aircraft seat of claim 7, wherein the aircraft seat dress cover further comprises a midpoint strap disposed on opposing ends of the peripheral portion.

10. The aircraft seat of claim 9, wherein the midpoint strap comprises:
    a first strap element disposed on a first side of the peripheral portion, the first strap element comprising a hook portion of a hook-and-loop connector; and
    a second strap element disposed on a second side of the peripheral portion, the second strap element comprising a loop portion of a hook-and-loop connector.

11. The aircraft seat of claim 9, wherein the midpoint strap comprises an elastic strap.

12. The aircraft seat of claim 7, wherein the tightening elements on each of the first terminus and the second terminus are configured to interlock with each other.

13. The aircraft seat of claim 7, further comprising two frame terminals disposed on the seat back frame, wherein the tightening elements on each of the first terminus and the second terminus are configured to engage one of the two frame terminals.

* * * * *